(No Model.)
C. WHITNEY.
ENDLESS CONVEYER DEVICE FOR AUTOMATIC SELF BINDERS.
No. 535,875. Patented Mar. 19, 1895.
Fig. 1.
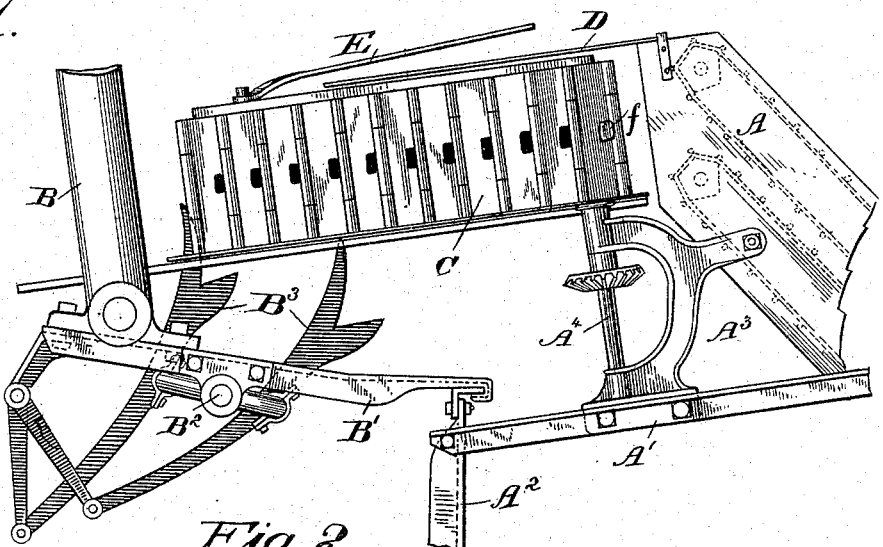
Fig. 2.
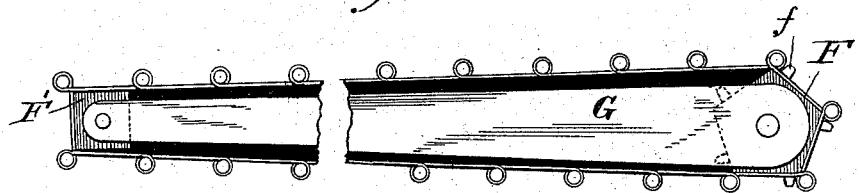
Fig. 3. Fig. 5.
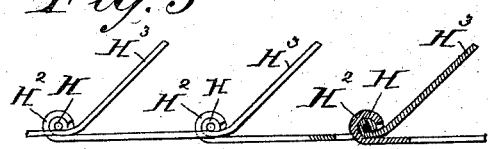
Fig. 4. Fig. 6.
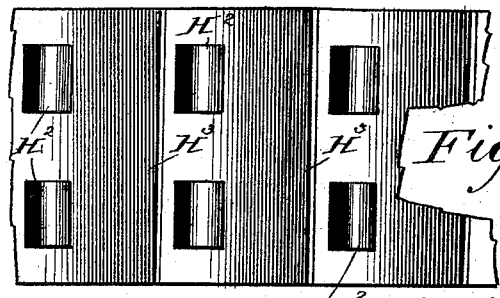
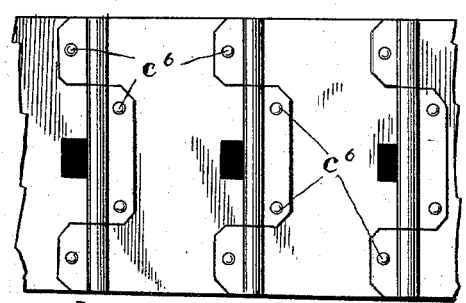
Fig. 7. Fig. 8.
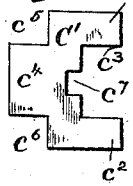
Witnesses.
Arthur Johnson
William F. Yeslin
Inventor.
Charles Whitney.

UNITED STATES PATENT OFFICE.

CHARLES WHITNEY, OF WINNETKA, ASSIGNOR TO THE DEERING HARVESTER COMPANY, OF CHICAGO, ILLINOIS.

ENDLESS CONVEYER DEVICE FOR AUTOMATIC SELF-BINDERS.

SPECIFICATION forming part of Letters Patent No. 535,875, dated March 19, 1895.

Application filed July 23, 1894. Serial No. 518,401. (No model.)

*To all whom it may concern:*

Be it known that I, CHARLES WHITNEY, of Winnetka, county of Cook, and State of Illinois, have invented certain new and useful Improvements in Endless Conveying Devices for Automatic Self-Binders, of which the following is a full description, reference being had to the accompanying drawings.

The object of my invention is to make possible the use of more substantial material than canvas for endless conveying devices.

In the production of my conveying device I employ sheet metal, preferably sheet steel, and the invention consists in forming plates of such length as to constitute the width of the conveying device, and so placed that a number of them properly jointed will form the length of the conveyer.

I have shown, in the drawings, three conveyers each having a different form of jointing of the plates that constitute it, and have also shown the device attached to a harvesting machine in the position of what is known as "grain adjuster," that is, its drums adapted to rotate on vertical axes, and the plane of the working surface of the conveyer vertical relative to its edges, the latter parallel with the binder table.

Figure 1 is a front view of a "left hand cut" harvesting machine with so much of the binding attachment and of the grain elevating devices as to show the proper relation of the endless conveyer when used as a "butt adjuster." Fig. 2 is an edge view of the grain conveyer when the latter is used as a platform conveyer, or the figure may be considered as a plan view of the grain adjuster of Fig. 1. Figs. 3 and 4 show a modified form of hinges and "slats." Fig. 5 is a sectional view of the grain conveyer designed to show the method of jointing shown in Fig. 6. Fig. 7 shows one of the preferable shapes into which I cut the sheets of metal that form the grain conveyer. Fig. 8 shows one method of jointing the blanks together.

A is the elevator frame of an ordinary grain harvester. The elevating conveyers are shown in dotted lines. I show in dotted lines as I do not deem it necessary to show the details of construction, having shown the latter in other portions of this figure and in other figures. I will confine the description particularly to the device when used as shown in Fig. 1 as a butt adjuster.

A' and A² are portions of the harvester frame, and A³ a bracket in which the shaft A⁴ is journaled that supports and drives the grain adjuster.

B represents a portion of the main binder frame and B' the binder supporting frame in bearings on which is the packer shaft B², having the usual cranks, and the packers B³ supported on and moved by the same.

C is the endless conveyer. Immediately above the conveyer, as shown in Fig. 1, is the grain shield D.

E is the rod by which the adjuster is moved so as to move its lower end to the rear or to the front of the binder table, as required.

From preference I make the drums which move the conveyer a pentagonal prism, and the idle roller around which it runs also polygonal, but the latter may be round if the metal plates are made sufficiently thick so that they will not bend in being drawn around it. In fact the roller that moves the conveyer may be cylindrical if provided with sprockets to give the conveyer positive movement. As stated, however, if the rollers are prismatical better results are reached because the drums are rendered capable of giving positive movement to the conveyer. As I wish to run the conveyer perfectly loose so as to avoid all friction, I provide the drum F with the sprockets $f$. The drum F', of course, being simply an idler to keep the conveyer drawn to its working position, requires no sprockets.

G is one of the conveyer frame supports. The other one, which is adjacent to the binder table of Fig. 1, is not shown, as it is wholly between the two parts of the conveyer. Suffice it to say that it is like G, and that it and G, suitably connected, form the swinging frame when used as a butt adjuster. When used, however, as a grain conveyer, the part G and its fellow may be bolted to the elevator frame A or the platform frame of a grain harvester. Into the piece G, preferably made of wood, the shaft A is journaled, and also the gudgeons of the polygonal drum F'. I cut my blanks into the form shown in Fig. 7, from a sheet of metal of width equal to the length of the blanks required for the grain conveyer, whether it be inches in width or feet. The blank C' is notched, (see Fig. 7) at $c$, leaving the tongues $c'$ and $c^2$. Within the notch $c$ is the sub-notch $c^3$ which, when the conveyer is completed, forms a hole through which the sprockets, (when sprockets are used) of the driving drum pass. Upon the other edge of the blank is formed the tongue $c^4$ having a length a little less than equal to the notch $c$ and upon either, in either longitudinal direction relative to this tongue are the spaces $c^5$ and $c^6$. The length of these spaces are a little greater than the lengths of the tongues $c'$ and $c^2$, so that the tongue $c^4$ of one plate may enter the space $c$ of the adjacent blank. These blanks are formed as shown in Fig. 8, where a single blank is represented as having the tongues formed into tubes. Through these tubes thus formed is thrust a hardwood cylinder, as seen in the figure which represents it as but partly thrust in place through the tubular portions of the jointed plates. If thin metal is used I find it preferable to make the tongues of such length that they may receive the rivets $c^6$. I prefer, however, the use of thicker metal, in which case rivets will not be necessary. I make the wooden cylinders and the surrounding tubes of such diameter that the joints may serve as the slats of the conveyer; that is to say that the joints may perform the office as what are known as "slats" on ordinary canvas grain conveyers. If desired, however, the stick may be dispensed with, and the form shown in Figs. 3 and 4, or some other suitable form be used. In the latter case, near the middle of the blank I cut one or more places having tongues that can be rolled into the form H. Upon the other edge I form the tongues H², that may be rolled around the tubes H, as shown in Fig. 3. The edge H³ of the plates I form as shown in Figs. 3 and 4, turning them at an angle relative to the main portion of the conveyer so as to permit them to perform the office of slats. This form is preferable where great aggressiveness is necessary.

In some of the forms represented in the drawings both edges of each plate are so turned that when the said plates are connected the turns form at the same time the "slat" of the conveyer and the hinge. In another form substantially the same construction is shown, but one edge of the plate is extended so as to form what is in effect a more aggressive "slat."

I am aware that strips of wood and possibly metallic plates have been secured to endless belts so as to form conveyers, but I am not aware that plates jointed together without the use of belts, chains, or similar parts have been used.

I have shown only one tongue and two notches, the number necessary for a narrow conveyer, but the number of notches and tongues may be increased to correspond with any width of conveyer desired.

I have shown but one opening in each plate for the passage of the sprocket that projects from the driving drum, but few or many may be used as desired.

The polygonal drum under some circumstances will be sufficient to actuate my grain conveying device, but I prefer the use of sprockets, as shown, in order to give it positive movement.

By having the joints of the plates wholly upon one side a polygonal drum with acute angles can be used and thus more aggressiveness of said drum made available because of the corners not needing to be cut away to permit any portion of the hinge to pass them. By providing the openings adjacent to the joint of the hinged plates the sprocket of the driving drum is given sufficient surface to operate upon to prevent the wearing that would follow the use of sprockets operating upon the edges of the metal if the said openings were formed away from said joints.

What I claim as my invention, and desire to secure by Letters Patent, is—

1. As an article of manufacture a grain adjuster belt adapted to operate in conjunction with a grain binder and packer fingers, said belt composed of strips of material pivotally connected together, their edges tongued and notched and formed into tubes and connected to each other by a rod of wood, said tubes made large so as to perform the office of "slats" wholly upon one surface of said belt, and having holes adjoining said tubes and thus adapted to permit the entrance of sprockets of the wheels employed to drive it in order that the said sprockets of the latter may have a large engaging surface with the said belt, substantially as described.

2. A grain straw conveyer consisting of a series of thin metal plates hinge-jointed together by means of tongues and notches, the said tongues all rolled into the form of tubes that lie wholly upon one side of the said metal plates, rods passing therethrough, openings in the said plates adjacent to said tubes, in combination with a wheel, its sprockets adapted to pass through the openings thus provided and act upon the surface of said tubes in giving motion to the said grain conveyer, substantially as described.

3. A grain-straw conveyer consisting of a series of plates jointed together, said plates of a length equal to the width of the conveying device to be produced and having the tongues $c'$, $c^2$ and $c^4$ and the notches $c$, $c^5$ and $c^6$, said tongues and said notches adapted to intermesh with adjacent tongues, and said tongues bent into tubular form and thus adapted to have pivot rods pass therethrough, the said notch or notches $c$ having a supplemental notch $c^3$ for the admission of the sprocket for moving the said conveying device, all combined substantially as described.

4. As an article of manufacture, a grain adjuster belt adapted to operate in conjunction with a grain binder and packer fingers, composed of strips of material pivotally connected to each other, said pivotal connections adapted to form projections wholly on the outer surface of said belt and having notches or holes adjoining said pivotal connections adapted to receive sprocket teeth for propelling the same, substantially as described.

CHARLES WHITNEY.

Witnesses:
M. E. HOLTON,
FRANK GETMAN.